United States Patent [19]

Shallenberger et al.

[11] Patent Number: 4,855,100
[45] Date of Patent: Aug. 8, 1989

[54] RECONSTITUTABLE CONTROL ROD SPIDER ASSEMBLY

[75] Inventors: John M. Shallenberger, Fox Chapel Borough; Stephen J. Ferlan, Wilkins Township, Allegheny County, both of Pa.

[73] Assignee: Westinghouse Electric Corp., Pittsburgh, Pa.

[21] Appl. No.: 162,841

[22] Filed: Mar. 2, 1988

[51] Int. Cl.⁴ .............................................. G21C 7/00
[52] U.S. Cl. .................... 376/327; 403/372; 403/383; 376/440; 376/446
[58] Field of Search .............. 376/327, 440, 446, 442; 403/372, 370, 383

[56] References Cited

U.S. PATENT DOCUMENTS

| Re. 27,950 | 3/1974 | Frisch | 376/442 |
|---|---|---|---|
| 3,335,064 | 8/1967 | Whittaker et al. | 176/86 |
| 3,510,398 | 5/1970 | Wood | 176/86 |
| 3,802,996 | 4/1974 | Jones | 376/440 |
| 3,888,598 | 6/1975 | Samiran et al. | 403/372 |
| 3,890,672 | 6/1975 | Berthagen | 403/372 |
| 3,968,008 | 7/1976 | Piepers et al. | 376/440 |
| 4,002,214 | 1/1977 | Schaumann | 403/372 |
| 4,165,194 | 8/1979 | Flower | 403/372 |
| 4,189,348 | 2/1980 | Donck et al. | 376/440 |
| 4,314,885 | 2/1982 | Edwards et al. | 376/327 |
| 4,323,428 | 4/1982 | Schallenberger et al. | 376/353 |
| 4,326,919 | 4/1982 | Hill | 376/267 |
| 4,344,915 | 8/1982 | Christiansen | 376/437 |
| 4,381,283 | 4/1983 | Walton | 376/327 |
| 4,432,934 | 2/1984 | Gjertsen et al. | 376/327 |
| 4,514,109 | 4/1985 | McKenna | 403/372 |
| 4,684,498 | 8/1987 | Paul | 376/446 |
| 4,684,502 | 8/1987 | Wilson et al. | 376/446 |
| 4,687,631 | 8/1987 | Wilson et al. | 376/446 |
| 4,707,329 | 5/1987 | Freeman | 376/449 |
| 4,711,756 | 12/1987 | Nakazato | 376/327 |
| 4,716,018 | 12/1987 | Boatwright et al. | 376/440 |

FOREIGN PATENT DOCUMENTS

| 0159509 | 4/1985 | European Pat. Off. |  |
|---|---|---|---|
| 0158812 | 10/1985 | European Pat. Off. |  |
| 0225805 | 6/1987 | European Pat. Off. |  |
| 2599884 | 11/1987 | France |  |
| 0067492 | 4/1984 | Japan | 376/327 |
| 2064985 | 9/1987 | Japan |  |

OTHER PUBLICATIONS

Hellcoil Bulletin 1000, 1985, J. O. King Inc., pp. 1-21, Alpharetta, GA.

*Primary Examiner*—Harvey E. Behrend

[57] ABSTRACT

A reconstitutable control rod spider assembly includes a spider structure, control rods, and attachment joints for detachably fastening the control rods to the spider structure. Each attachment joint includes a connecting finger of the spider structure having a central bore extending therethrough and a pair of opposing flat segments formed on the interior thereof, and an elongated upper end plug of each control rod inserted through the finger bore and having a pair of opposing flat sectors formed on the exterior thereof beng interfitted with the opposing flat segments on the connectng finger to retain the control rod in a predetermined angular position relative to the finger. The upper end plug also has an externally-threaded portion formed on the exterior thereof above the flat sectors and being disposed above the connecting finger, and a pilot aligning portion formed on an outer terminal end thereof above the externally-threaded portion. Also, a securing nut having a central bore, an open bottom end and a closed top end, is inserted over the pilot portion and the externally-threaded portion of the upper end plug and has a radially flexible and expandable thread-defining element captured in the bore of the nut. The element is detachable fastened on the externally-threaded portion of the upper end plug to secure the upper end plug to the connecting finger.

7 Claims, 5 Drawing Sheets

RECONSTITUTABLE CONTROL ROD SPIDER ASSEMBLY

CROSS REFERENCE TO RELATED APPLICATIONS

Reference is hereby made to the following copending applications dealing with related subject matter and assigned to the assignee of the present invention:

1. "Burnable Absorber Rod Push Out Attachment Joint" by Joseph B. Mayers et al, assigned U.S. Ser. No. 089,384 and filed Aug. 25, 1987, a division of U.S. Ser. No. 774,850, filed Sept. 12, 1985, now abandoned.

2. "Burnable Absorber Rod Push Out Attachment Joint" by Joseph B. Mayers et al, assigned U.S. Ser. No. 089,203 and filed Aug. 25, 1987, a division of U.S. Ser. No. 774,850, filed Sept. 12, 1985, now abandoned.

BACKGROUND OF THE INVENTION

1. Field of the Invention

The present invention relates generally to nuclear reactors and, more particularly, is concerned with a reconstitutable control rod spider assembly incorporating detachable attachment joints for fastening the control rods to the spider structure.

2. Description of the Prior Art

In a typical nuclear reactor, such as a pressurized water type, the reactor core includes a multiplicity of fuel assemblies. Each fuel assembly is composed of top and bottom nozzles with a plurality of elongated transversely spaced guide thimbles extending longitudinally between and attached at opposite ends to the nozzles. Also, a plurality of transverse support grids are axially spaced along and attached to the guide thimbles. Further, a plurality of elongated fuel elements or rods transversely spaced apart from one another and from the guide thimbles are supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

Since the rate of heat generation in the reactor core is proportional to the nuclear fission rate, and this, in turn, is determined by the neutron flux in the core, control of heat generation at reactor start-up, during its operation and at shutdown is achieved by varying the neutron flux. Generally, this is done by absorbing excess neutrons using control rods which contain neutron absorbing material. The guide thimbles, in addition to being structural elements of the fuel assembly, also provide channels for insertion of the neutron absorber control rods within the reactor core. The level of neutron flux adn thus the heat output of the core is normally regulated by the movement of the control rods into and from the guide thimbles.

One common arrangement utilizing control rods in association with a fuel assembly can be seen in U.S. Pat. No. 4,326,919 to Hill. This patent shows a control rod spider assembly which includes a plurality of control rods and a spider structure supporting the control rods at their upper ends. The spider structure, in turn, is connected to a control drive mechanism that vertically raises and lowers (referred to as a stepping action) the control rods into and out of the hollow guide thimbles of the fuel assembly. The typical construction of the control rod used in such an arrangement is in the form of an elongated metallic cladding tube having a neutron absorbing material disposed within the tube and with end plugs at opposite ends thereof for sealing the absorber material within the tube.

The spider structure typically includes a plurality of radially extending vanes supported on and circumferentially spaced about a central hub. The vanes are flat metal plates positioned on edge and being connected at their inner ends to the central hub. Cylindrical shaped control rod connecting fingers are mounted to and supported by the vanes, with some of the vanes having only a single connecting finger and other vanes having a spaced pair of connecting fingers associated therewith.

Typically, the upper end plug of each control rod has a threaded outer end which is receivable into a bore in the lower portion of one finger of the spider structure and threadable into a tapped hole formed in the finger at the inner end of the bore. The end plug is then secured or locked therein by a key or pin inserted into the side of the finger and the end plug and then welded therein. Generally speaking, the above-described control rod spider assembly is not reconstitutable, that is, the assembly cannot readily be taken apart and worn or damaged components replaced. Instead, the whole assembly must be discarded.

In many older nuclear reactor plants, the control rods are approaching the end of their design life. Furthermore, in a number of newer plants with modified reactor internals, the control rods are experiencing accelerated wear. In most cases wear occurs over local areas on the cladding of some, but not all, control rods of a given control rod spider assembly. Wear is believed to be caused by coolant flow-induced vibration. The severity of the clad wear is dependent upon the type of nuclear plant and internals design and typically occurs only on a limited number of control rods of a given assembly.

Consequently, there is a growing interest in and need for reconstitutable control rod spider assemblies wherein selected individual control rods that are prematurely worn or damaged can be removed and replaced. A spider assembly which allows removal of a control rod from a spider structure by severing or cutting off the threadably fastened top end of the control rod is disclosed in French patent application No. 86/08381. Spider assemblies which allow removal of a control rod from a spider structure by deforming a locking element on the top end of the control rod are disclosed in U.S. Pat. Nos. to Edwards et al (4,314,885) and Walton (4,381,283). However, none of these disclosures would appear to be the optimum approach to providing a reconstitutable control rod spider assembly.

SUMMARY OF THE INVENTION

The present invention provides a reconstitutable control rod spider assembly designed to satisfy the aforementioned needs. The reconstitutable control assembly of the present invention incorporates a detachable attachment joint for fastening each of the control rods to the spider structure. The attachment joint is mechanically simple, provides the flexibility of permitting rotation and further use of a partially worn control rod as an option to replacement, and is relatively easy to reconstitute. By provision of the attachment joint of the reconstitutable control assembly of the present invention the reconstitution operation can be accomplished faster, with less tooling and inspection and the fastening element of the joint is reusable.

In contrast thereto, to prevent loosening and escape of threaded parts, the prior art approaches employ deformable or otherwise welded parts which must be replaced after removal and which require replacement of the control rod. The necessity for such locking parts is eliminated in the construction of the attachment joint used in the reconstitutable control assembly of the present invention.

Accordingly, the present invention sets forth in a reconstitutable control assembly including a spider structure and at least one control rod, an attachment joint for detachably fastening the control rod to the spider structure. The attachment joint comprises: (a) a hollow connecting finger of the spider structure; (b) an elongated upper end plug of the control rod having an externally-threaded portion formed on the exterior thereof and being disposed above the connecting finger when the upper end plug is inserted through the connecting finger; and (c) a securing nut being insertable over the externally-threaded portion of the upper end plug once the upper end plug has been inserted through the connecting finger, the securing nut including radially flexible and expandable thread-defining means being detachably fastenable in a vibration and impact resistant attached relation on the externally-threaded portion of the upper end plug once the upper end plug has been inserted through the connecting finger for completing the attachment joint between the connecting finger of the spider structure and the upper end plug of the one control rod.

More particularly, the connecting finger and the upper end plug have complementary interfitting means defined thereon which allow angular adjustment of the control rod to, and positive retention at, any one of two or more different predefined angularly-displaced positions relative to the finger. In particular, the complementary interfitting means includes a pair of opposing flat segments formed on the interior of the connecting finger, and a pair of opposite flat sectors formed on the exterior of the upper end plug and adapted to interfit with the opposing flat segments of the finger.

Further, the upper end plug has an upwardly-facing indicator element defined on a terminal upper end thereof which has a known predetermined orientation with respect to the opposing flat sectors on the upper end plug and is observable from a remote location thereabove by someone carrying out rotation of the control rod from one to another of the predefined angularly-displaced positions of the control rod.

Also, the upper end plug has a pilot aligning portion formed on an outer terminal end thereof above the externally-threaded portion. The securing nut has a central bore, an open bottom end and a closed top end, and is insertable over the externally-threaded portion and the pilot portion of the upper end plug. Still further, the radially flexible and expandable thread defining means of the securing nut is insertable within a bore of the nut into a captured relation therein. Preferably, the radially flexible and expandable thread defining means is in the form of a screw thread coil insert.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
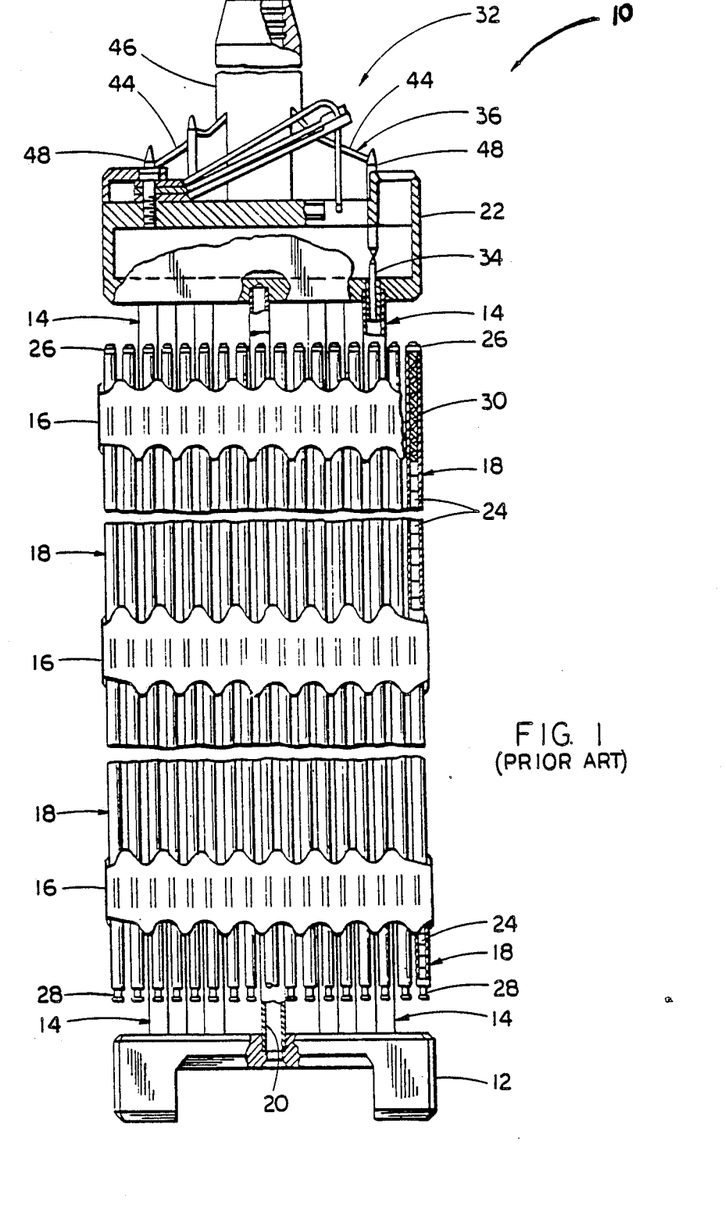
FIG. 1 is a side elevational view, with parts partially sectioned and broken away for purposes of clarity, of a prior art fuel assembly having a prior art control rod spider assembly being disposed above the fuel assembly.

Referring now to the drawings, and particularly to FIG. 1, there is shown an elevational view of a nuclear reactor fuel assembly, represented in vertically foreshortened form and being generally designated by the numeral 10. Being the type used in a PWR, the fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Prior Art Control Rod Spider Assemblies

Figure 2:
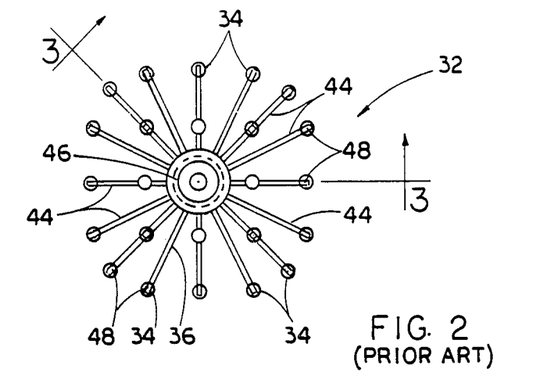
FIG. 2 is a top plan view of the control rod spider assembly removed from the fuel assembly of FIG. 1.
Figure 3:
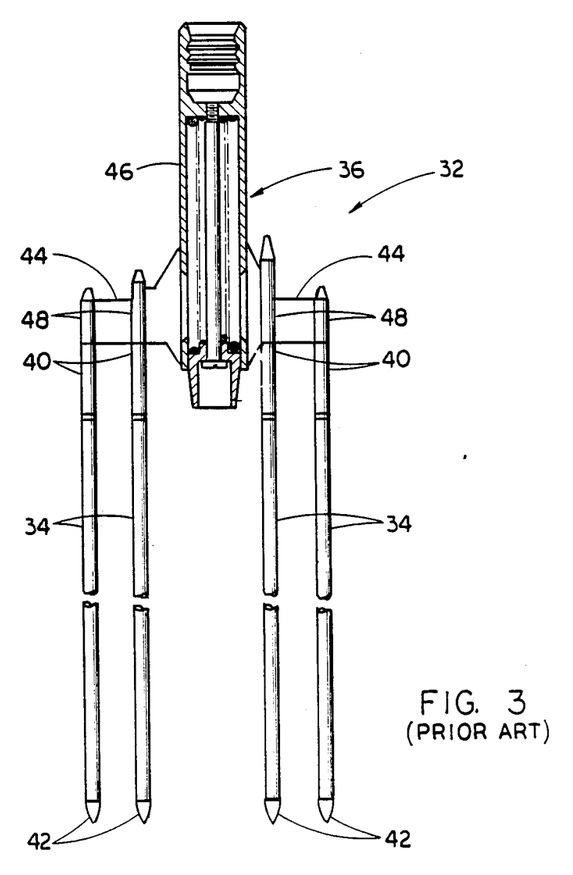
FIG. 3 is an elevational view, with parts partially sectioned, of the control assembly as seen along line 3—3 of FIG. 2.
Figure 4:
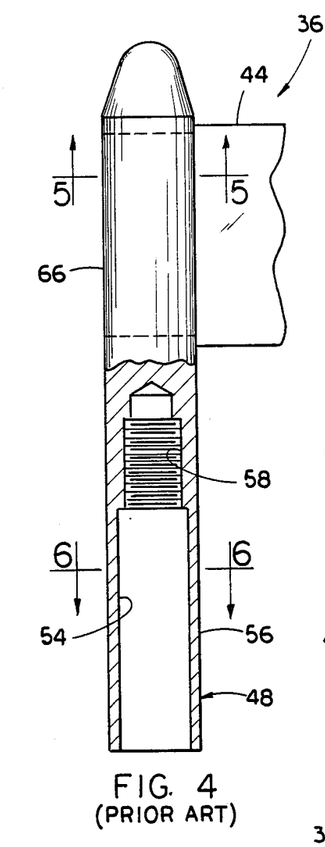
FIG. 4 is an enlarged fragmentary view, with parts partially sectioned and broken away, of a spider structure of the control assembly of FIG. 3.
Figure 5:
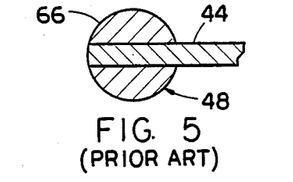
FIG. 5 is a cross-sectional fragmentary view of a vane and control rod connecting finger of the spider structure taken along line 5—5 of FIG. 4.
Figure 6:
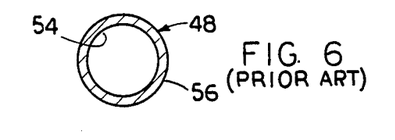
FIG. 6 is a cross-sectional view of the connecting finger taken along line 6—6 of FIG. 4.
Figure 7:
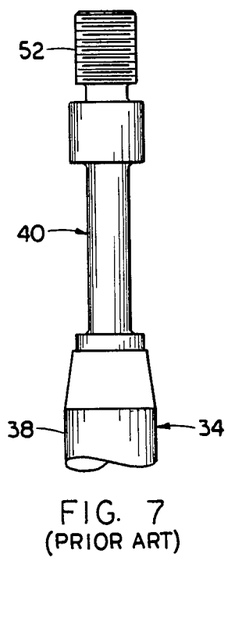
FIG. 7 is an enlarged fragmentary view of one control rod of the control assembly of FIG. 3, illustrated the upper end plug thereof.
Figure 8:
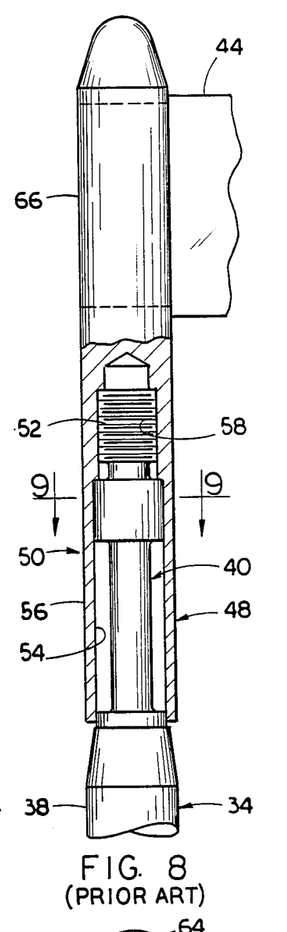
FIG. 8 is an enlarged fragmentary view, with parts partially sectioned and broken away, of the control assembly of FIG. 3, illustrating a prior art attachment joint between the control rod connecting finger on one vane of the spider structure of the control assembly and the upper end plug of one of the control rods thereof.
Figure 9:
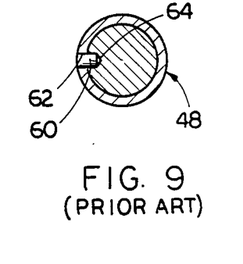
FIG. 9 is a cross-sectional view of the upper end plug inserted in the connecting finger taken along line 9—9 of FIG. 8, illustrating a pin locking the end plug and finger together.

Turning now to FIGS. 2 and 3 as well as FIG. 1, there is shown a typical embodiment of a conventional control rod spider assembly, generally designated 32, designed for use in the conventional fuel assembly 10 of FIG. 1. In its basic components, the control assembly 32 includes a plurality of control rods 34 and a spider structure 36 which supports the control rods at their upper ends. The spider structure 36 holds the control rods 34 in a pattern matched to that of the guide thimbles 14 which adapts them to be inserted through the top nozzle 22 and downward through the guide thimbles 14 of the PWR fuel assembly 10. The spider structure 36 is connected to a control mechanism (not shown) which is operable in a known manner to move the control rods 34 so as to regulate core power.

In a typical construction, each control rod 34 of the control assembly 32 is composed of an elongated metallic cladding tube 38 having a neutron absorbing material disposed therein and upper and lower end plugs 40,42 attached at opposite ends of the cladding tube 38 for sealing the absorber material therewithin. The spider structure 36 of the control assembly 10 typically includes a plurality of radially extending flukes or vanes 44 supported on and circumferentially spaced about a central hub 46. Cylindrical shaped control rod connecting fingers 48 are mounted to and supported by the vanes 44. Some of the vanes 44 have only a single connecting finger 48 attached thereon, whereas other vanes 44 have a spaced pair of connecting fingers 48 associated therewith.

Turning now to FIGS. 4-9, there is illustrated one prior art attachment joint, generally indicated by the numeral 50, provided between each control rod connecting finger 48 on the vane 44 of the control assembly spider structure 36 and the upper end plug 40 of each control rod 34. Typically, the upper end plug 40 of each control rod 34 has a threaded outer end 52. Each connecting finger 48 is mounted to the vane 44 in a bayonet-type of welded connection, and has an axial bore 54 formed in a lower portion 56 thereof with a smaller-diameter threaded hole 58 tapped therein at the inner end of the bore 54. The threaded outer end 52 of the upper end plug 40 is threadably received in the tapped hole 58 when the plug 40 is received within the axial bore 54. The end plug 40 is secured or locked therein by a key or pin 60 inserted through aligned holes 62,64 in the sides of the finger 48 and end plug 40 and then welded thereto. Parenthetically, it should be pointed out that the axial bore 54 terminates at the start of an upper portion 66 of each connecting finger 48 where the finger connects with the vane 44.

A major disadvantage of this conventional control assembly 32 is that it is not reconstitutable; that is, the assembly 32 cannot readily be taken apart and have worn or damaged components thereof replaced. Instead, the whole assembly has to be discarded.

However, as mentioned earlier, control rod spider assemblies having removable control rods are known in the prior art. One recent control rod spider assembly that is reconstitutable is disclosed in the aforecited French patent application No. 86/08381. Similar to the above-described prior art control assembly, the French control assembly includes a spider structure with connecting fingers on vanes and a plurality of control rods with upper end plugs having a threaded outer end. However, the attachment joint employed to secure each control rod to one connecting finger is modified somewhat from that described above. Each connecting finger of the French control assembly has an axial bore extending therethrough from end to end. When the upper end plug of one control rod is inserted through the axial bore, its threaded outer end extends above the top end of the finger. A fastener or nut is threaded onto the outer end of the control rod upper end plug until it contacts the top end of the finger. Then a tubular locking cup formed on the control rod upper end plug above the threaded outer end and extending above the threaded nut is deformed radially outward to lock within a groove in the nut to retain the nut thereon.

However, disadvantageously, to remove the control rod from the spider structure, the portion of the end plug which includes the threaded outer end with the nut fastened thereon must first be severed or cut off. Thus, the fastening nut must be replaced after removal and the removed control rod with the partially severed upper end plug must be replaced. It cannot be used further even if only partially entirely spent.

Control Rod Spider Assembly of the Present Invention

Figure 20:
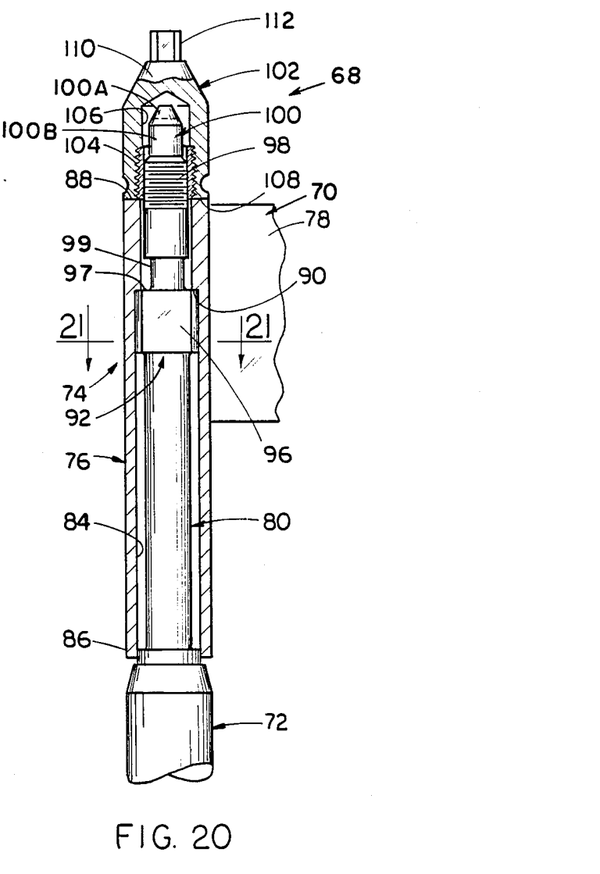
FIG. 20 is an enlarged fragmentary view, with parts partially sectioned and broken away, of the control rod spider assembly of the present invention, illustrating an improved attachment joint between the control rod connecting finger on one vane of the spider structure of the control assembly and the upper end plug of one of the control rods thereof.
Figure 21:
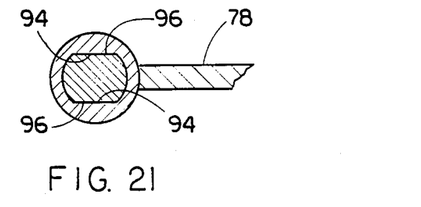
FIG. 21 is a cross-sectional view of the upper end plug inserted in the connecting finger taken along line 21—21 of FIG. 20.

Turning now to FIGS. 10–24, there is shown particularly in FIG. 20, in fragmentary form, a reconstitutable control rod spider assembly, generally designated by the numeral 68 and constructed in accordance with the principles of the present invention, which eliminates the disadvantages of the above-described prior art control assemblies as well as those of the other assemblies disclosed in the U.S. patents cited in the background section supra. The reconstitutable control assembly 68 basically includes a spider structure 70, a plurality of control rods 72, and a plurality of improved attachment joints 74 for detachably fastening the control rods 72 to the spider structure 70. Except for the parts thereof to be described hereinafter, the spider structure 70 and control rods 72 of the control assembly 68 are identical to that of the prior art control assembly 32 of FIGS. 2 and 3.

Figures 10, 11, 14:
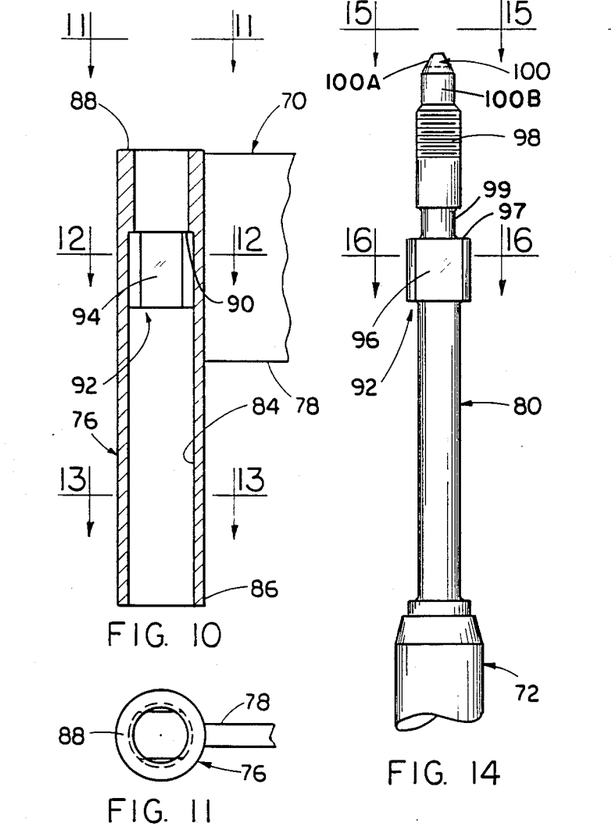
FIG. 10 is an enlarged fragmentary view, with parts partially sectioned and broken away, of a spider structure of a control rod spider assembly constructed in accordance with the principles of the present invention.
FIG. 11 is a top plan fragmentary view of a vane and control rod connecting finger of the spider structure as seen along line 11—11 of FIG. 10.
FIG. 14 is an enlarged fragmentary view of one control rod of the control rod spider assembly of the present invention, illustrating the upper end plug thereof.

Each attachment joint 74 includes a hollow sleeve-like connecting finger 76 supported on a fluke or vane 78 of the spider structure 70 and an elongated stem-like upper end plug 80 of the control rod 72. The connecting finger 76 and vane 78 can be fabricated by any suitable method, such as by either casting, machining or butt-welding of parts. The finger 76 has a central bore 84 defined therethrough from a bottom end 86 to a top end 88 thereof. The shorter upper end portion of the bore 84 is somewhat smaller in diameter than the much longer bottom end portion thereof so as to define a downwardly facing annular shoulder 90 on the interior of the finger 76.

Figure 12:
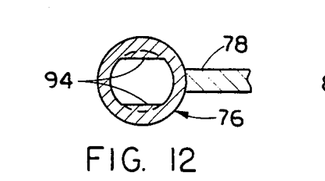
FIG. 12 is a cross-sectional fragmentary view of the vane and connecting finger taken along line 12—12 of FIG. 10, illustrating a pair of opposing flat segments formed on the interior of the tubular connecting finger.
Figure 13:
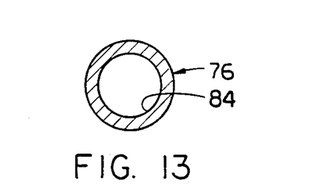
FIG. 13 is a cross-sectional view of the connecting finger taken along line 13—13 of FIG. 10.
Figure 16:
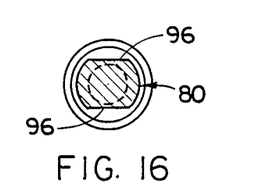
FIG. 16 is a cross-sectional view of the upper end plug taken along line 16—16 of FIG. 14, illustrating a pair of opposing flat sectors formed on the exterior of the end plug.

The attachment joint 74 also includes complementary interfitting means, generally indicated at 92, defined on both the connecting finger 76 and the upper end plug 80. The interfitting means 92 allow angular rotation adjustment of the control rod 72 to, and positive retention at, any one of two or more different predefined angularly-displaced positions relative to the finger 76. Preferably, two different positions angularly displaced 180 degrees apart are defined for the control rod 72. With respect to the connecting finger 76, the interfitting means 92 takes the form of a pair of opposing flat segments 94 defined in the interior of the finger 76 and located immediately below the shoulder 90 on the interior of the finger. With respect to the upper end plug 80, the interfitting means 92 takes the form of a pair of opposing flat sectors 96 defined on the exterior of the end plug 80. The flat sectors 96 are spaced apart slightly less than the flat segments 94 thereby adapting them to interfit with the flat segments on the connecting finger 76 such that the top edge 97 of each flat sector 96 is in abutting engagement with the downwardly facing annular shoulder 90 on the interior of the finger 76 so as to retain the control rod in one of the two predefined positions angularly displaced 180 degrees from one another.

Figure 17:
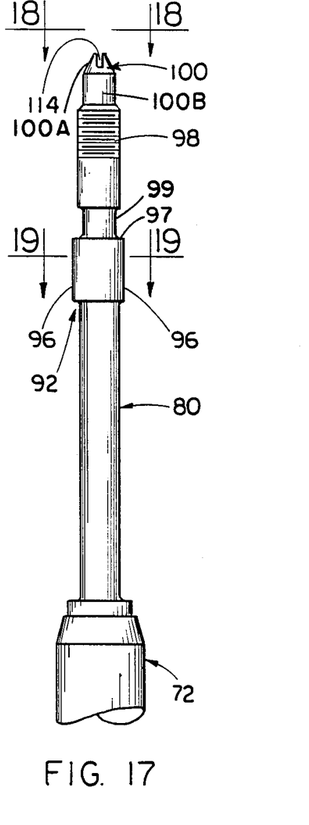
FIG. 17 is a view similar to that of FIG. 14 but with the control rod rotated through ninety degrees from the position in FIG. 14.

Additionally, the attachment joint 74 includes an externally-threaded cylindrical portion 98 formed on the exterior of the upper end plug 80 and spaced above the opposing flat sectors 96 by a reduced diameter portion 99. A bullet nose shaped pilot aligning portion 100 is formed on the outer terminal end of the end plug 80 above the threaded cylindrical portion 98. The pilot aligning portion 100 is somewhat smaller in diameter than the threaded cylindrical portion 98. As seen in FIGS. 14, 17 and 20, the pilot aligning portion 100 is non-deformable and includes an outer conical terminal end section 100A and an inner cylindrical section 100B disposed between and interconnecting the outer terminal end section 100A and the externally-threaded portion 98. The threaded portion 98 and the pilot portion 100 on the upper end plug 80 is disposed above the top end 88 of the connecting finger 76 when the upper end plug 80 is inserted through the connecting finger 76 from the bottom end 86 thereof.

Figure 22:
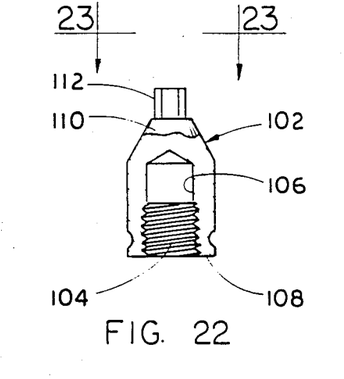
FIG. 22 is a longitudinal axial view of a securing nut of the improved attachment joint in the control assembly of FIG. 20, illustrating the nut alone.
Figure 23:
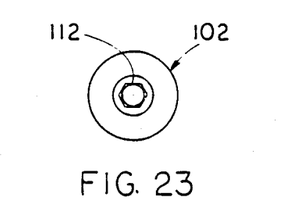
FIG. 23 is a top plan view of the securing nut as seen along line 23—23 of FIG. 22.

Further, the attachment joint 74 has a securing nut 102 incorporating radially flexible and expandable thread-defining means 104. The thread-defining means 104 can be provided in the nut 102 either integrally, such as in the form of a flex nut, or separately, such as in the form of an element insertable within a central bore 106 of the nut. In addition to the bore 106 in the securing nut 102, it has an open bottom end 108 and a closed top end 110. A hex element 112 is formed on the exterior of the closed top end 110 for use in remotely threading and unthreading the nut 102 onto and from the threaded portion 98 on the upper end plug 80 of each control rod 72.

Figure 24:
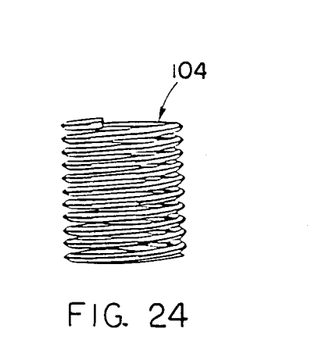
FIG. 24 is an enlarged side elevational view of a radially flexible and expandable thread-defining element of the improved attachment joint in the control assembly of FIG. 20, the element illustrated being in the form of a screw thread coil insert.

Thus, once the upper end plug 80 has been inserted through the central bore 84 of the connecting finger 76 via its bottom end 86 in mounting the control rod 72 to the spider structure 70, the securing nut 102 is insertable over the externally-threaded portion 98 and the pilot portion 100 of the upper end plug 80 for completing attachment of the nut 102 onto the upper end plug 80. Preferably, a separate radially flexible and expandable thread-defining element 104 in the form of a screw thread coil insert as seen in FIG. 24, is insertable within the bore 106 of the securing nut 102 into a captured relation therein. The coil insert 104 can be commercial product marketed under the tradename HeliCoil. The locking action of the coil insert 104 is achieved by one or more of the insert coil windings having a series of straight segments or "chords". When the threaded portion 98 enters the "grip" coil, these chordal segments flex outward, creating pressure on the threaded portion 98.

When the nut 102 is inserted over the pilot and threaded portions 100, 98 and rotated until its bottom end 108 contacts the top end 88 of the finger 76, the screw thread coil insert 104 becomes detachably fastened in a vibration and impact resistant attached relation on the externally-threaded portion 98 of the upper end plug 80. The coil insert 104 prevents inadvertent loosening and escape of the control rod 82 and securing nut 102 with comparable reliability to other mechanical locking devices permitting removal.

For precluding cross-threading of the screw thread coil insert 104 with the end plug threaded portion 98, the coil insert 104 first receives the end plug pilot portion 100 before receiving the end plug threaded portion 98 so as to force align of the securing nut 102 with the pilot portion 100 before any threads are engaged. Such preclusion of cross-threading is essential to facilitate remote installation and removal of the securing nut 102 onto and from the upper end plug 80 since a slight axial misalignment of the nut on the threaded portion will readily cross-thread.

Figure 15:
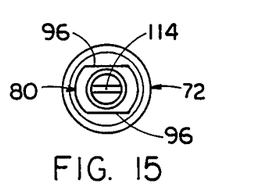
FIG. 15 is a top plan view of the upper end plug of the one control rod as seen along line 15—15 of FIG. 14.
Figure 18:
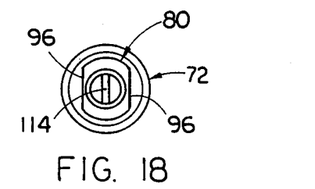
FIG. 18 is a top plan view of the upper end plug of the one control rod as seen along line 18—18 of FIG. 17.
Figure 19:
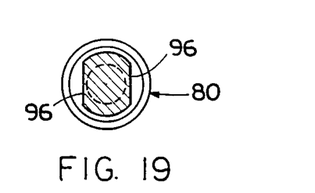
FIG. 19 is a cross-sectional view of the upper end plug taken along line 19—19 of FIG. 17, illustrating the opposing flat sectors formed on the exterior of the end plug.

To facilitate precise rotation of the control rod 82 to and placement at one of its two positions, angularly-displaced 180 degrees apart and defined by the interfitting opposing flat segments and sectors 94,96 on the interior of the finger 76 and exterior of the upper end plug 80, the upper end plug 80 has an upwardly-facing indicator element 114 in the form of a screw driver tip engaging slot defined on a terminal upper end thereof. The slot 114 has a known predetermined orientation, such as a parallel relation, with respect to the opposing flat sectors 96 on the upper end plug 80. The slot 114 is observable from a remote location thereabove by someone carrying out rotation of the control rod 72 from one to another of the predefined angularly-displaced positions of the control rod.

It will be observed that the use of the interfitting opposing flat segments and sectors 94,96 on the finger 76 and end plug 80 prevent rotation of the control rod 72 during torquing and untorquing of the securing nut 102 without the need for some complex rod holding mechanism below the control assembly, a difficult task during remote operations such as required at a reactor plant spent fuel pool. With the control rod attachment joint 74 located above the spider structure finger and vane 76,78 plus the employment of the anti-rotation flat segments and sectors 94,96, the need to restrain the control rod during nut removal and reinstallation is eliminated and the reconstitution operation is simplified. Also, the repair work station, fixtures, and tooling are less complex and less costly.

Further, the ability to permit the precise 180 degree rotation of a control rod worn over only a portion of its circumference allows continued use of the rod rather than replacement, providing an additional savings in operating costs. It has been observed that severe wear often occurs only on the inboard side of certain control rods. It is possible to replace just one bad rod, put in a whole new set of rods or merely rotate one or more rods 180 degrees. It should be readily apparent that more than two matched flat segments and sectors could be provided to allow rotation of control rods by amounts less than 180 degrees if desired.

Rod rotation is accomplished by loosening and removing the securing nut 102, lifting the spider structure 70 upwardly less than one inch, and rotating the worn control rod by inserting a screw driver ended long-handled tool into the slot 114 in the top end of the upper end plug 80 and turning it 180 degrees. Then, the spider structure 70 is lowered over the rotated rod and the same nut is used to secure the rotated rod to the finger 76 of the spider structure.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a reconstitutable control rod spider assembly for use with a nuclear fuel assembly, said control assembly including a spider structure and at least one control rod, an attachment joint for detachably fastening the control rod to the spider structure, said attachment joint comprising:

(a) a hollow connecting finger of said spider structure having a central bore defined therethrough from a bottom end to a top end thereof, an upper end portion of said bore being smaller in diameter and shorter in length than a bottom portion of said bore so as to define a downwardly facing annular shoulder on the interior of said finger between said end portions, and a pair of opposing flat segments formed on the interior of said finger extending from said shoulder and into said bottom end portion of said bore;

(b) an elongated upper end plug of said control rod having a pair of opposing flat sectors formed on the exterior thereof and adapted to interfit with said opposing flat segments on said connecting finger such that a top edge defined by said flat sectors abut said shoulder above said flat segments to thereby positively retain said control rod in one of a pair of predefined angularly-displaced positions relative to said connecting finger when said upper end plug is inserted through said connecting finger from said bottom end thereof, an externally-threaded portion formed on the exterior thereof above said flat sectors and being spaced therefrom by a reduced diameter portion, at least a portion of said externally-threaded portion extending substantially above said top end of said connecting finger when said upper end plug is inserted through said connecting finger from said bottom end thereof, and a non-deformable pilot aligning portion formed thereon outwardly of and being of smaller diameter than said externally-threaded portion; said pilot aligning portion including an outer conical terminal end section and an inner cylindrical section disposed between and interconnected said outer terminal end section and said externally-threaded portion; and (c) fastening means insertable over said outer conical terminal end section and said inner cylindrical section of said pilot portion and then over said externally-threaded portion of said upper end plug once said upper end plug has been inserted through said connecting finger, said fastening means having an internally-threaded portion being detachably fastened and locked on said externally-threaded portion of said upper end plug once said upper end plug has been inserted through said connecting finger for completing said attachment joint between said connecting finger of said spider structure and said upper end plug of said one control rod, said outer conical terminal end section and inner cylindrical section of said pilot portion being of sufficient length extending outwardly of said externally-threaded portion of said upper end plug to permit alignment of said externally-threaded portion of said upper end plug by said pilot portion thereof with said internally-threaded portion of said fastening means before threading of said threaded portions together can commerce so as to preclude cross-threading of said threaded portions during remote installation and removal of said fastening means onto and from said upper end plug.

2. The attachment joint as recited in claim 1, wherein said connecting finger and said upper end plug have complementary interfitting means defined thereon which allow angular adjustment of said control rod to, and positive retention at, any one of two or more different predefined angularly-displaced positions relative to said finger.

3. The attachment joint as recited in claim 1, wherein said upper end plug has an upwardly-facing indicator element defined on said outer terminal end section of said pilot portion thereof, said indicator element having a known predetermined orientation with respect to said opening flat sectors on said upper end plug and being observable from thereabove for facilitating carrying out rotation of said control rod from one to another of said predefined angularly-displaced positions of said control rod.

4. The attachment joint as recited in claim 1, wherein said fastening means includes:
   securing nut having a central bore, an open bottom end and a closed top end, and being insertable over said pilot portion and said externally-threaded portion of said upper end plug; and
   a radially flexible and expandable thread-defining element insertable within said bore of said nut into a captured relation therein.

5. The attachment joint as recited in claim 4, wherein said radially flexible and expandable defining element is in the form of a screw thread coil insert.

6. In a reconstitutable control rod spider assembly for use with a nuclear fuel assembly, said control assembly including a spider structure and at least one control rod, an attachment joint for detachably fastening the control rod to the spider structure, said attachment joint comprising:
   (a) hollow connecting finger of said spider structure having a central bore defined therethrough from a bottom end to a top end thereof, an upper end portion of said bore being smaller in diameter and shorter in length than a bottom portion of said bore so as to define a downwardly facing annular shoulder on the interior of said finger between said end portions, and a pair of opposing flat segments formed on the interior of said finger extending from said shoulder and into said bottom portion of said bore;
   (b) an elongated upper end plug of said control rod having a rod of opposing flat sectors formed on the exterior thereof and adapted to interfit with said opposing flat segments on said connecting finger such that a top edge defined by said flat sectors abut said shoulder above said flat segments to thereby positively retain said control rod in one of a pair of predefined angularly-displaced positions relative to said connecting finger when said upper end plug is inserted through said connecting finger from said bottom end thereof, an externally-threaded portion formed on the exterior thereof above said flat sectors and being spaced therefrom by a reduced diameter portion, at least a portion of said externally-threaded portion extending substantially above said top end of said connecting finger when said upper end plug is inserted through said connecting finger from said bottom end thereof, and a non-deformable pilot aligning portion formed thereon outwardly of and being of smaller diameter than said externally-threaded portion, said pilot aligning portion including an outer conical terminal end section and an inner cylindrical section disposed between and interconnecting said outer terminal end section and said externally-threaded portion;
   (c) a securing nut having a central bore, an open bottom end and a closed top end, said nut being insertable over said outer conical terminal end section and said inner cylindrical section of said pilot aligning portion and then over said externally-threaded portion of said upper end plug once said upper end plug has been inserted through said connecting finger from said bottom end thereof; and
   (d) a radially flexible and expandable thread-defining element inserted within said bore of said nut into a captured relation therein and being detachably fastened and locked in an attached relation on said externally-threaded portion of said upper end plug once said upper end plug has been inserted through said connecting finger from said bottom end thereof for completing said attachment joint between said connecting finger of said spider structure and said upper end plug of said one control rod, said outer conical terminal end section and inner cylindrical section of said pilot portion being of sufficient length extending outwardly of said externally-threaded portion of said upper end plug to permit insertion of said securing nut over said pilot portion before said externally-threaded portion and thereby alignment of said externally-threaded portion of said upper end plug by said pilot portion with said thread-defining element in said securing nut before threading together of said externally-threaded portion and said thread-defining element can commence so as to preclude cross-threading of said externally-threaded portion and thread-defining element during remote installation and removal of said securing nut and thread-defining element onto and from said upper end plug.

7. The attachment joint as recited in claim 6, wherein said radially flexible and expandable thread-defining element is in the form of a screw thread coil insert.

* * * * *